US012354039B2

(12) United States Patent
Varghese et al.

(10) Patent No.: US 12,354,039 B2
(45) Date of Patent: Jul. 8, 2025

(54) DETECTION AND CLASSIFICATION OF IMPEDIMENTS

(71) Applicant: Accenture Global Solutions Limited, Dublin (IE)

(72) Inventors: Vinu Varghese, Bangalore (IN); Anto Jose, Thodupuzha (IN); Balaji Janarthanam, Chennai (IN); Selvakuberan Karuppasamy, Chennai (IN); Saumyabrata Mitra, Kolkata (IN); Karthik Srikantamurthy, Mysuru (IN); Ravi Kant Gaur, Bangalore (IN); Ragav Devanathan, Chennai (IN); Nirav Jagdish Sampat, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 302 days.

(21) Appl. No.: 17/808,039

(22) Filed: Jun. 21, 2022

(65) Prior Publication Data

US 2023/0410004 A1 Dec. 21, 2023

(51) Int. Cl.
*G06Q 10/0631* (2023.01)
(52) U.S. Cl.
CPC ............ *G06Q 10/06312* (2013.01); *G06Q 10/063114* (2013.01)
(58) Field of Classification Search
CPC ........... G06Q 10/06312; G06Q 10/063114
See application file for complete search history.

(56) References Cited

U.S. PATENT DOCUMENTS 9,324,022 B2 * 4/2016 Williams, Jr. ......... G06N 3/045
10,540,573 B1 * 1/2020 Li ......................... G06F 18/217
(Continued)

FOREIGN PATENT DOCUMENTS

CN 110968695 A 4/2020

OTHER PUBLICATIONS

Chatterjee, Ranit, et al. "A pipeline for automating labeling to prediction in classification of NFRs." 2021 IEEE 29th International Requirements Engineering Conference (RE). IEEE, 2021. (Year: 2021).*

(Continued)

*Primary Examiner* — Andre D Boyce

(57) ABSTRACT

Systems and methods for detecting, classifying, and managing impediments are disclosed. For example, embodiments may be related to impediments in project management. The proposed systems and methods are configured to evaluate data harvested from multiple different sources (in different formats), identify potential impediments that may be described or present in the data, and classify said impediments based on whether the impediment is non-technical or technical. In addition, the proposed systems implement a technical solution of active learning combined with reinforcement learning to produce a feedback loop that, over each iteration, improves the accuracy of the impediment classification. The impediment management assistant is configured to identify impediments from various inputs sources across industries with an AI-based self-learning capability, providing a robust and accurate model even with only a limited training dataset.

20 Claims, 9 Drawing Sheets

(56) References Cited

U.S. PATENT DOCUMENTS

| | | | |
|---|---|---|---|
| 10,838,833 B1* | 11/2020 | Jibaja | G06F 11/2094 |
| 10,970,395 B1* | 4/2021 | Bansal | G06F 21/566 |
| 11,010,233 B1* | 5/2021 | Golden | G06F 21/554 |
| 2017/0099200 A1* | 4/2017 | Ellenbogen | G06V 10/764 |
| 2020/0111023 A1* | 4/2020 | Pondicherry Murugappan | G06N 5/02 |
| 2021/0383261 A1* | 12/2021 | Hanna | G06N 5/04 |
| 2022/0083933 A1 | 3/2022 | Nag et al. | |
| 2023/0066403 A1* | 3/2023 | Matsuoka | H04L 51/234 |
| 2023/0325272 A1* | 10/2023 | Golden | G06F 21/64 714/47.2 |

OTHER PUBLICATIONS

Hernández-González, Jerónimo, et al. "Learning to classify software defects from crowds: a novel approach." Applied Soft Computing 62 (2018): 579-591. (Year: 2018).*

* cited by examiner

DETECTION AND CLASSIFICATION OF IMPEDIMENTS

TECHNICAL FIELD

The present disclosure generally relates to the field of artificial intelligence. More specifically, the present disclosure generally relates to artificial intelligence-based detection and classification of impediments.

BACKGROUND

In project management, it can be difficult to track the status of all tasks and to determine why a task is stalled. Managing development of a project and/or ongoing use of the project may be resource intensive, while also being prone to human error. This may result in poor user experience, and may lead to excessive use of computing resources (e.g., from a person authoring program code, creating work schedules for subordinates, managing finances of a project, researching an issue, providing a failed recommendation for the issue, re-researching to identify another recommendation for the issue, etc.). In other cases, managing a project (with or without human intervention) may be difficult due to a project management platform receiving a large volume of data relating to multiple aspects of a project. This may result in high computer processing and/or storage costs. For example, applying a project management system in a field that uses big data may require classifying and/or processing tens of thousands, hundreds, thousands, or even millions of data points. Moreover, aspects of a project may be managed 24 hours a day and 365 days a year, which may require excessive cost for human-based monitoring. Furthermore, human-based monitoring may be error prone, resulting in increased processing to correct human errors. Though a project lifecycle may be associated with a large set of data, data that may be useful for training a machine learning model to identify impediments or other errors is unfortunately limited. Thus, accurately training a traditional machine learning model to detect or classify impediments may not be feasible.

There is a need in the art for a system and method that addresses the shortcomings discussed above.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

SUMMARY

Figure 1:
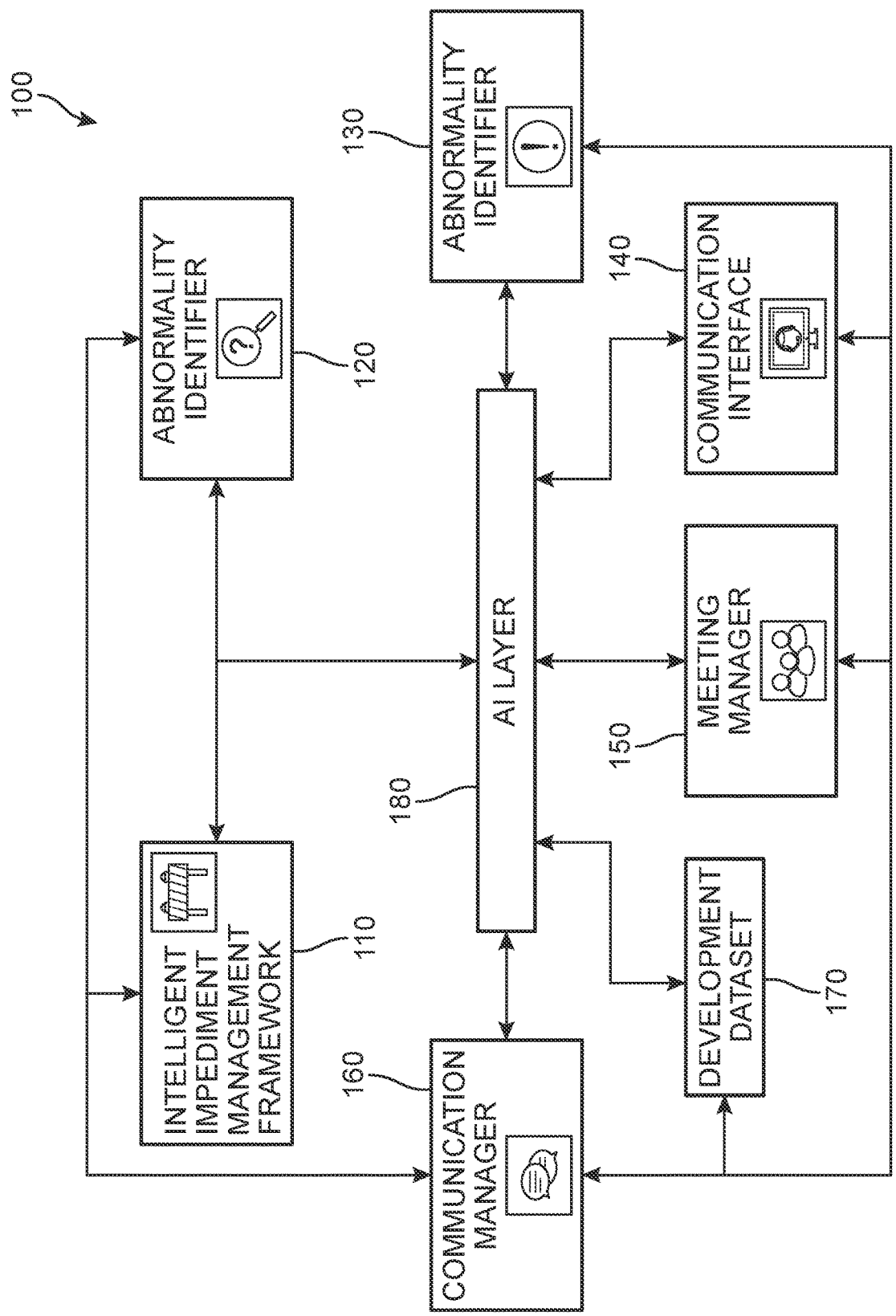
FIG. 1 is a schematic diagram of an overview of an embodiment of an intelligent project management environment.

Some implementations described herein may provide for an impediment management assistant to evaluate project lifecycle data harvested from multiple different sources (in different formats), identify potential impediments that may be described or present in the data, classify said impediments based on whether the impediment is non-technical or technical, assign a priority level to the impediment, and determine a tracking and management framework for the impediment. In addition, the proposed systems implement a technical solution of active learning combined with reinforcement learning to produce a feedback loop that, over each iteration, improves the accuracy of the impediment classification model. The impediment management assistant is configured to identify impediments from various inputs sources across industries with an AI-based self-learning capability, providing a robust and accurate model even with only a limited training dataset.

While the disclosed embodiments are based on project management, it is understood that other classification systems can benefit from active learning combined with reinforcement learning, as disclosed herein. For example, systems classifying whether documents are relevant or irrelevant to a particular issue or topic may benefit from active learning combined with reinforcement learning, as disclosed herein. In addition, systems for managing and tracking maintenance of other types of large, distributed systems with many moving parts or stages of development, can implement embodiments of the impediment management assistant described herein. For example, facilities such as factories, manufacturing plants, zoos, circuses, and amusement parks, as well as other facilities with multiple components, exhibits, or rides, that rely on each other to perform optimally can be impacted throughout the day by a wide variety of impediments. Impediments can detract from their performance over time. Tracking these issues using the proposed impediment management assistant can (a) ensure impediments are addressed efficiently and in a timely fashion and (b) help the organization appreciate what types of issues are recurring and/or how often they occur, whether the impediment involves the distribution of resources, inter-personnel communication, or the operation of the devices and hardware supporting the facility, etc. Such knowledge can significantly improve the performance of the facility over the long run, as well as reduce operating costs by fostering proactive interventions.

In different embodiments, the impediment management assistant provides an end-to-end lifecycle assessment and implementation of an early warning and monitoring system to reduce utilization of computing resources based on faster completion of tasks (e.g., less resources may be needed to complete the task), reduce utilization of computing resources and/or network resources based on decreasing a period of time where a device is using additional resources to complete a task (e.g., a network device may use less resources to complete a task using an automated tool relative to slow, manual completion of the task by a user), and/or the like. Furthermore, faster resolution of processes and tasks thereof improves stakeholder experience and minimizes time that a team member may lose due to the process not being completed (e.g., a user may be unable to work if a process relating to resolving an impediment is not completed). Moreover, automation of impediment tracking and resolution tracking increases an accuracy of process adherence, thereby reducing errors relating to a project relative to manual completion of the process.

In one aspect, the disclosure provides computer-implemented method of artificial intelligence (AI)-based impediment management during project development lifecycles. A first step of the method includes receiving a first dataset associated with a first project, the first dataset including first content from a first communication channel and second content from a second communication channel, where a first format of the first dataset differs from a second format of the second dataset. A second step includes performing, by an active learning module, a first active learning cycle in which data from the first dataset is labeled and then used to train a first model to classify data points as either technical or non-technical based on a classification feature set. A third step includes identifying at least a first work item in the first dataset, and a fourth step includes detecting, with respect to a first data point in the first dataset, a first impediment that is associated with the first work item. In addition, the method includes a fifth step of classifying, using the first model, the first impediment as technical or non-technical, a sixth step of selecting a first stakeholder of the first project based on the classification of the first impediment, and a seventh step of generating a message notifying the first stakeholder of the first impediment.

In another aspect, the disclosure provides a non-transitory computer-readable medium storing software comprising instructions executable by one or more computers which, upon such execution, cause the one or more computers to: (1) receive a first dataset associated with a first project, the first dataset including first content from a first communication channel and second content from a second communication channel; (2) perform, by an active learning module, a first active learning cycle in which data from the first dataset is labeled and then used to train a first model to classify data points as either technical or non-technical based on a classification feature set; (3) identify at least a first work item in the first dataset; (4) detect, with respect to a first data point in the first dataset, a first impediment that is associated with the first work item; (5) classify, using the first model, the first impediment as technical or non-technical; (6) select a first stakeholder of the first project based on the classification of the first impediment; and (7) generate a message notifying the first stakeholder of the first impediment.

In another aspect, the disclosure provides a system for artificial intelligence (AI)-based impediment management during project development lifecycles, the system comprising one or more computers and one or more storage devices storing instructions that are operable, when executed by the one or more computers, to cause the one or more computers to: (1) receive a first dataset associated with a first project, the first dataset including first content from a first communication channel and second content from a second communication channel; (2) perform, by an active learning module, a first active learning cycle in which data from the first dataset is labeled and then used to train a first model to classify data points as either technical or non-technical based on a classification feature set; (3) identify at least a first work item in the first dataset; (4) detect, with respect to a first data point in the first dataset, a first impediment that is associated with the first work item; (5) classify, using the first model, the first impediment as technical or non-technical; (6) select a first stakeholder of the first project based on the classification of the first impediment; and (7) generate a message notifying the first stakeholder of the first impediment.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

DESCRIPTION OF EMBODIMENTS

A software development project may include activities such as computer programming, documentation, testing, and bug fixing involved in creating and maintaining a software product. A variety of techniques may be used for project management, for example, in the area of product development. With respect to project implementation generally, a team may be identified to implement a project plan, identify personnel and equipment that are needed to implement the project plan, set a project timeline, and conduct ongoing meetings to determine a status of implementation of the project plan. The project plan may include aspects such as a project timeline, and if the project plan is not executed properly, the project plan and/or personnel, equipment, timeline, etc., associated with the project plan must be modified to accommodate the setbacks.

In performing software development, various methodologies may be employed, some of which emphasize speed and flexibility through the collaborative effort of self-organizing cross-functional teams. In such a development project, a provider may provide a lifecycle management platform that incorporates applications to assist with and/or automate development, such as development applications, application delivery applications, application maintenance applications, or the like. It should be understood that the proposed techniques can be readily extended and applied to various project lifecycle management approaches, including but not limited to agile, DevOps deployment, waterfall, rapid application development (RAD), feature driven development (FDD), lean software development, scrum software development, extreme programming (XP), etc. Software development may focus individual conversations to maintain a continuous flow of information within a team, and through implementation of ceremonies such as daily stand up, sprint planning, sprint review, backlog grooming and sprint retrospective sessions. During adherence to their designated framework, a team may be expected to build a potentially shippable increment (PSI) of a product at the end of every iteration. As these time-boxes may be relatively short in nature (e.g., from 1 week to 5 weeks, etc.), a team may find it technically challenging to follow all of the processes within an iteration, and thus face a risk of failing to deliver a potentially shippable increment for a product.

The apparatuses, methods, and non-transitory computer readable media disclosed herein may address the aforementioned technical challenges by utilizing artificial intelligence (AI) to enhance the speed, precision, and effectiveness of implementation of the project implementation framework as disclosed herein. In this regard, artificial intelligence capabilities may be utilized as disclosed herein to identify, predict, and resolve impediments, which may expedite outcomes and may further increase the quality and accuracy of the outcomes. As a general matter, an impediment may be described as any technical or non-technical challenge that may occur with respect to implementation of a project. Examples of "technical" impediments may include a technical challenge associated with operation of a test server, a technical challenge faced by a project team towards completion of a task, integration of code in an existing system, etc. In this regard, the apparatuses, methods, and non-transitory computer readable media disclosed herein may provide for control, for example, of a system, such as a server or any computerized device generally that may be implemented for a project, based on the identification of the impediment. For example, when an impediment associated with operation of a test server is identified, the apparatuses, methods, and non-transitory computer readable media disclosed herein may provide for control (e.g., shut-down) of the test server. Similarly, when an impediment associated with integration of code in an existing system is identified, the apparatuses, methods, and non-transitory computer readable media disclosed herein may provide for control of an application to remove the application from service until the impediment is addressed.

A "non-technical" impediment can also be understood to refer to anything that slows down or hinders the productivity of a team, hence affecting the successful delivery of a product, though it manifests differently than the technical impediments. The impediment could be a missing resource or unresolved dependencies, a sick team member, or business or customer-related roadblocks. These non-technical impediments are a normal occurrence in a development team and can occur at any time due to the complexity and dynamics involved in the product development process. Teams may encounter a variety of challenges, as well as challenges with respect to people and processes, governance, communication, etc., which may each represent an impediment. For example, teams may encounter incomplete development segments leading to high onsite dependency, and work slow-down due to non-availability and/or limited access, for example, to a product owner and/or a Project Lead where a team is distributed and scaled. Further, teams may face challenges with respect to maintaining momentum with continuous progress of development events through active participation, and maintaining quality of artefacts (e.g., backlog, burndown, retrospective action log, etc.). Additional non-technical challenges may be related to organizations that perform projects for both local and international clients across multiple time zones with some team members working part time overseas. In this regard, the non-technical challenges may be amplified when a project demands for a team to practice its methodology at scale since various members of a team may be located at different locations, and are otherwise unable to meet in a regular manner.

Conventional project management systems lack tools that would monitor and identify the early warning signals of these and other impediments, instead relying on manual tracking. In addition, there is a lack of a data driven knowledge repository; instead, such information is retained in the minds of practitioners, making transitions between team members and implementation of solutions highly dependent on the personal experience of the individuals on the team. In order to address at least the aforementioned technical challenges, the apparatuses, methods, and non-transitory computer readable media disclosed herein provide for artificial intelligence, active learning, and reinforcement learning in the context of an intelligent impediment management framework to provide automatic impediment detection, identification, tracking, escalation, guidance, and personalized notifications during development of a project.

In different embodiments, the artificial intelligence may be designated, for example, as a bot-based impediment manager virtual assistant that 'listens' to the project team's communications across different channels. The bot is trained to pay attention to the aspects of dialogue, text, and other data records related to the project in real-time, day by day, until the closure of the sprint for the project. Active and passive learning together are applied to automatically detect similarities between excerpts of communication content ('snippets') and the training dataset. Every time a potential impediment is detected, it is logged and recorded, and then classified as either technical or non-technical. The system can then track the progress of the impediment's resolution and ensure the appropriate team member(s) or other stakeholders are aware of the impediment. In other words, rather than 'everyone' receiving a notification regarding the impediment, only those who are directly responsible and/or represent the person most likely to address the issues underlying the impediment will receive a message. Such limited communication will encourage those who receive the system-generated notifications to actually pay attention to the warning, rather than shrug off the message as a generalized broadcast. Furthermore, if the necessary corrective actions are not taken by the team member in a timely fashion, the bot can escalate the priority assigned to the impediment to raise awareness of its criticality, serving as an early warning signal to developers. The recordation of the impediments will also provide a valuable resource to future project planning, where such information can be reviewed and offer a cautionary context, whereas manual recordation typically misses logging of all impediments that occurred over the course of a project's development.

For purposes of introduction, FIG. 1 depicts an embodiment of an architecture of an intelligent project management environment ("environment") 100. The environment 100 includes a plurality of components that are each configured to communicate with and to one another via an AI layer 180. As shown in FIG. 1, the environment 100 includes an intelligent impediment management framework 110, a clarification manager 120, an abnormality identifier 130, a communication interface 140, a meeting manager 150, and a communication manager 160. The AI layer 160 is further augmented by reference to a development methodology dataset 170 that provides training data for the operations of the intelligent impediment management framework 110. As will be described in greater detail below, the intelligent impediment management framework 110 is configured to identify the impediment from multiple input sources, such as chat logs, conversations, etc. and update the project development management tool for software teams and other work (e.g., Azure DevOps/JIRA, or other software management tools), referred to herein as the project development tool.

The clarification manager 120 is configured to capture the functional questions from the conversation and tracking it in the project development tool and facilitate query resolution. In addition, the abnormality identifier 130 is configured to identify any abnormal trends that may occur with respect to various conditions such as (for example) the Definition of Done (DoD), a list of requirements that a user developmental stage/feature must adhere to for the team to call it complete, the Definition of Ready (DoR), which is used to determine whether work on a task is ready to be started by collection of all the conditions necessary for a user developmental stage/feature to be developed in the current sprint as defined by discussion among the team, the product owner and the Team Leader or Project Manager. The Definition of Done (DoD) represents the organization's or team's formal definition of quality for all Product Backlog Items (PBIs). In different embodiments, the detection of one or more abnormalities are what are used by the system to determine whether there is a high likelihood of an impediment. While in some cases one abnormality by itself may represent a sufficient basis for the identification of an impediment by the system, in other cases detection of a single abnormal trend may not be sufficient. However, the detected abnormality can—when evaluated in a context of a specific range or type of performance data, metrics, or in connection with another type of abnormality—be used by the system to determine there is now a high likelihood of an impediment that should be tracked.

The communication interface 140 is configured to provide and facilitate a voice and/or text interface with the bot assistant for impediment tracking and follow-ups. The meeting manager 150 is configured to provide intelligent meeting scheduling and capture of the meeting notes/minutes. Finally, the communication manager 160 is configured to provide timely notifications, follow-ups based on each user's behavior, and automated escalations as needed, and facilitate collaboration between team members.

Figure 2:
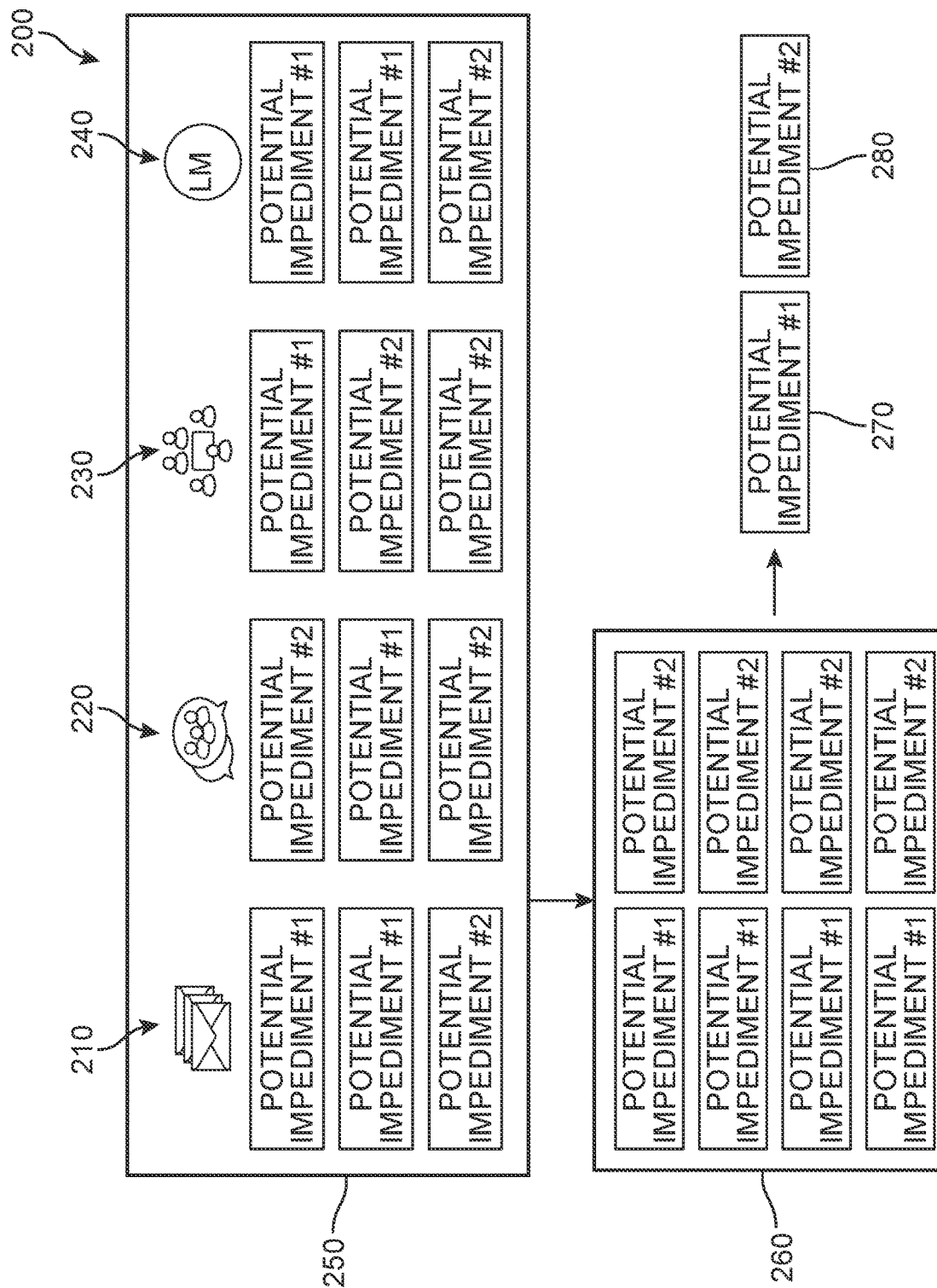
FIG. 2 is a schematic diagram of detecting impediments during a project lifecycle, according to an embodiment.

As a general matter, the proposed systems can be understood to implement a sequence of stages to identify and manage impediments. In what will be referred to as a "Stage Zero", data collection and grouping across multiple channels can be performed, as schematically illustrated in FIG. 2. For purposes of this application, communication channels refer to mediums through which a message may be conveyed to its intended audience. For example, phone calls, text messages, emails, recordings of meetings, video, radio, and social media are all types of communication channels. Furthermore, data collected from each type of communication channel will be associated with a different programming language and/or data format, or a different definition of the structure of data that gives the information its meaning in that channel's database or storage system. Simply for purposes of example, a communication channel may include formats comprising primarily one of (a) audio, (b) character, (c) numeric, (d) graphic, (e) UCS-2, (f) CCSID, (g) indicator, (h) binary, (i) float, (j) timestamp, etc. The proposed system is configured to extract meaning from each source within the context of its particular data format.

Thus, during Stage Zero, the system harvests information across communication channels that can vary widely in data format and type, for example including e-mails 210, team chat logs 220, team meeting content 230 (including notes, transcriptions, recordings, etc.), and methodology/software development lifecycle management (LM) data 240. From each of these sources, the system collects, assesses, evaluates, and determines whether a potential impediment is indicated. The system can review the specific data from each source, as well as the larger project context, when making its determination. Simply for purposes of illustration, in FIG. 2, each communication channel is shown with a set of potential impediments that were detected over the course of a day based on messages, calls, or other communications and content that occurred over that channel. Thus, upon reviewing e-mails 210, the system identified two instances in which a first impediment ("potential impediment #1") was discussed or cited, as well as one instance in which a second impediment ("potential impediment #2") was raised. Similarly, content in team chat logs 220 revealed one instance in which the first impediment ("potential impediment #1") was discussed, as well as two instances in which the second impediment ("potential impediment #2") was discussed.

For example, during Stage Zero, an analyzer module for the system can evaluate, for each data point in the lifecycle (e.g., a set of processes associated with the project implementation framework), whether the service level agreement or other team contract is not implemented for at least one specified occurrence of a work item. In this regard, the analyzer may identify, based on an assessment of the work item or task is being discussed or described as being associated with at least one impediment (e.g., hindrance).

Furthermore, data associated with team meeting content 230 revealed one instance in which the first impediment ("potential impediment #1") was discussed, as well as two instances in which the second impediment ("potential impediment #2") was discussed. Finally, software lifecycle management data (LM data 240) was shown to indicate two instances in which the first impediment ("potential impediment #1") was discussed, as well as one instance in which the second impediment ("potential impediment #2") was raised. The system can then determine that while collectively there are eight instances 260 of impediment-related content occurring, there is overlap in the problem that is being captured. Thus, the instances 260 are classified to fall under one of two different impediment types (first impediment 270 and second impediment 280). In some embodiments, the system is configured to generate an output that extracts various channel content that has a high likelihood of being related to some type of impediment. In some cases, the output can comprise information about the source of the content, an identifier for locating the content, and an excerpt of the content that included some impediment-related communication. One example of such an output is shown in Table 1 below:

TABLE 1

| Cluster ID | ID | Source | Impediment |
|---|---|---|---|
| 6 | 29 | Daily Team Meeting | Yesterday, I worked on User Creation Coding and there was no impediment. |
| 6 | 36 | Daily Team Meeting | Yesterday, I worked on User Creation Coding and there was no impediment. |
| 2 | 32 | Emails | The product owner needs to come back with clarification for user unit of work-x12 for further processing |
| 2 | 12 | Daily Team Meeting | I am faced with an impediment to get approval on the budget to setup the environment from account leadership |

Figure 3:
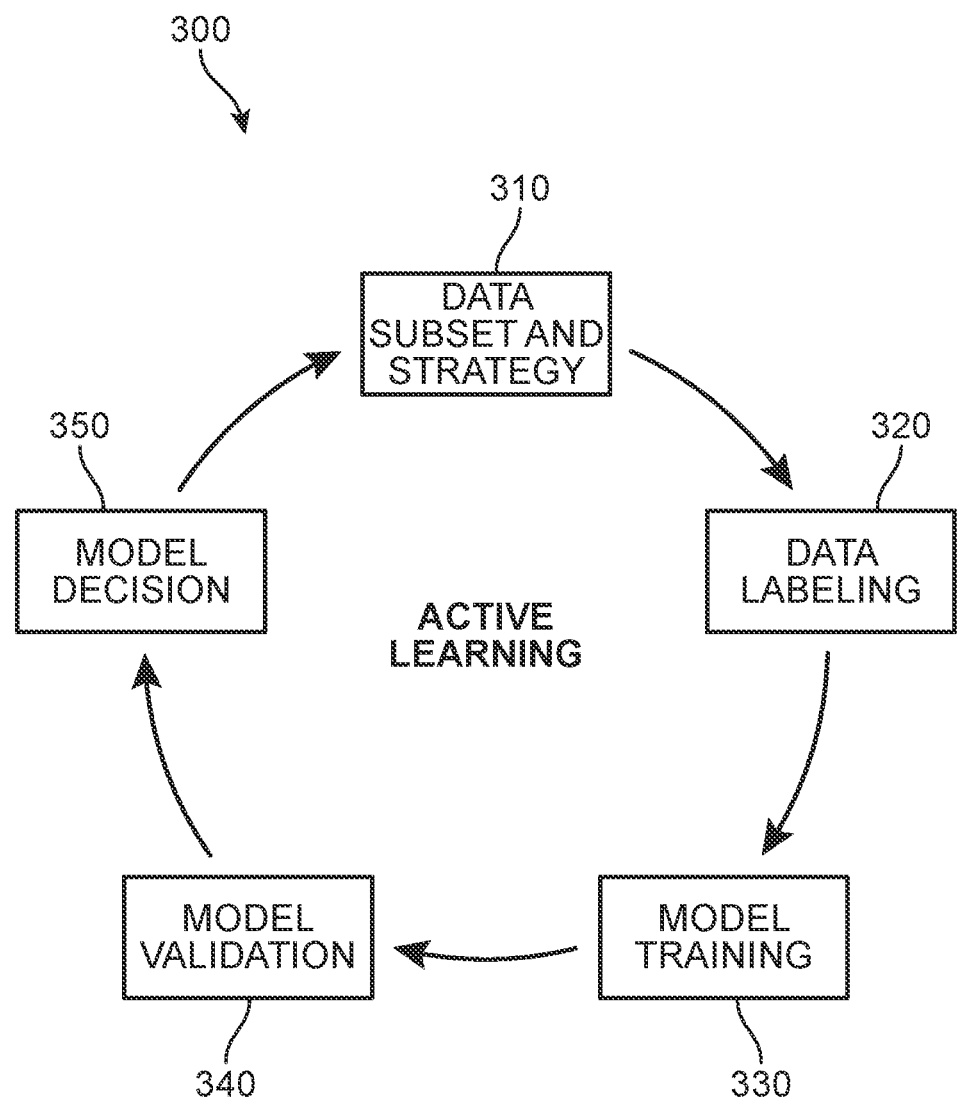
FIG. 3 is a schematic diagram of an active learning cycle, according to an embodiment.

Referring now to FIG. 3, a flow diagram presenting an embodiment of an active learning cycle 300 is shown. As a general matter, active learning is a technique whereby a machine seeking to label data can request input from a user to label specific instances of data. For example, in those instances where the machine encounters ambiguity on how to label a particularly frequent data point, well-known active teaming techniques would cause the machine to query a user to disambiguate only that data point (or a small subset of similarly frequent and ambiguous data points), thereby speeding up the process of learning without requiring complete supervision by the user. In different embodiments, active learning techniques incorporate user input or feedback to improve the accuracy of models developed by learning-capable algorithms. In the case of classification algorithms applied to text, such techniques are capable of determining which words, if designated by a user as being either an attribute or value, would most improve the accuracy of the learning model. Generally, this is done by estimating how much the model can learn from knowing the label of an unlabeled example. Some techniques for accomplishing this include, but are not limited to, random sample selection or the density or KL-divergence sample selection metrics.

The active learning cycle 300 is performed as part of what will be referred to as a "Stage One", which can follow Stage Zero. During the initial active learning cycle 300, an active learning module collects data (from multiple communication channels) as depicted in FIG. 2 in a first step 310. The active learning module then selects a subset of the collected data in a second step 320 to train its classification model in a third step 330. The model is configured to classify each data point as either a "Technical" impediment or a "Non-Technical" impediment. The model is validated in a fourth step 340, and outputs its decision in a fifth step 350. In different embodiments, the active learning module learns from the keywords present in the training data and the context from the input text in order to perform the active classification (as "Technical" or "Non-Technical" impediments). Two examples of outputs from the active learning module are provided below:

Example 1

Source: daily team meeting
Impediment: today, I am continuing to work on user creation coding
Impediment Type: technical
Source: daily team meeting
Impediment: today, I am preparing a business case for additional funding request for CI/CD environment setup.
Impediment Type: technical Example 2

Figure 4:
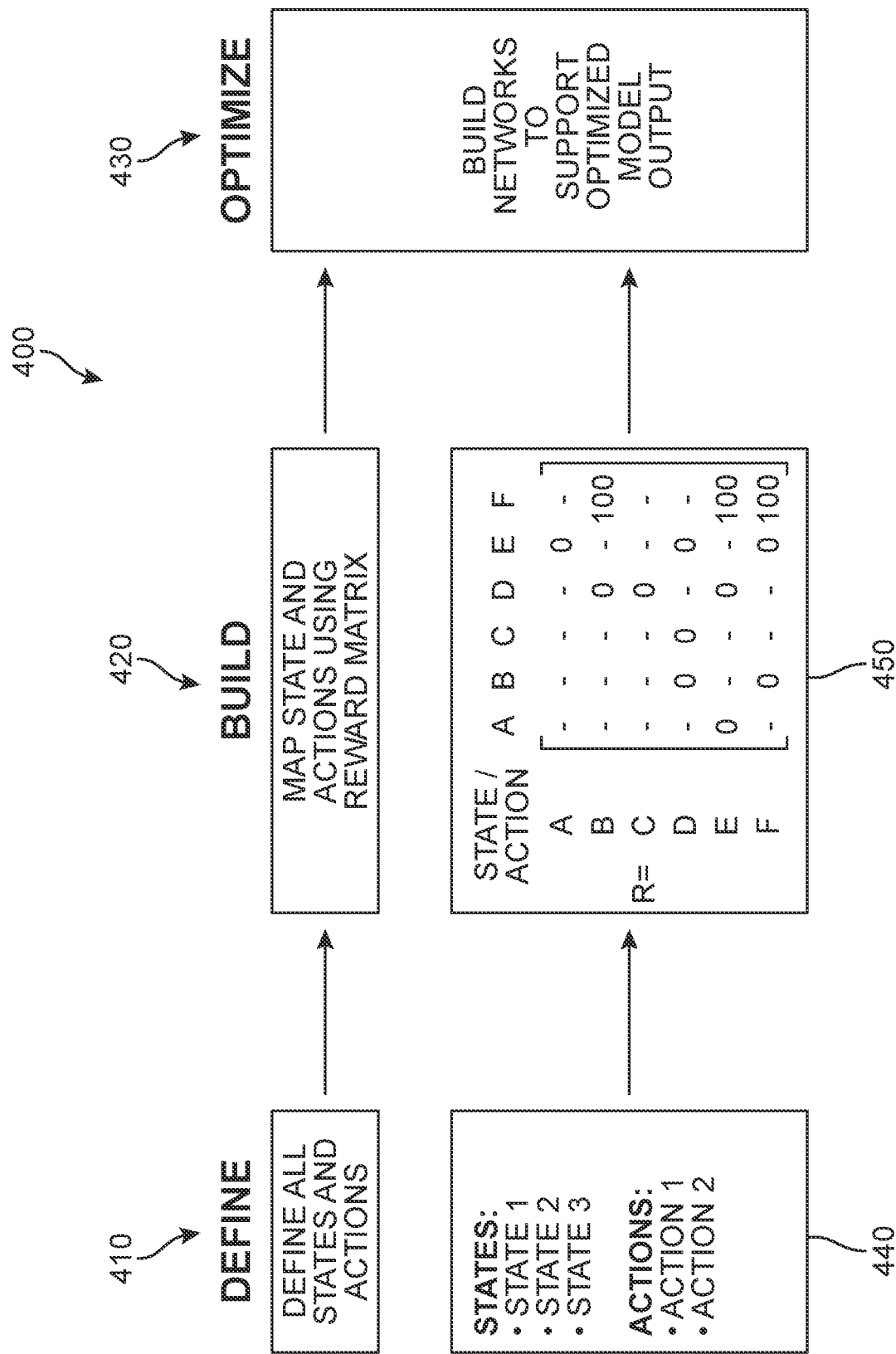
FIG. 4 is a schematic diagram of a reinforcement learning process, according to an embodiment.

Source: emails
Impediment: UI feature broke when we are navigating to page x via page y.
Impediment Type: technical
Source: daily team meeting
Impediment: work segment, feature, work unit mapping is not done for the business case—
user admin page resulting in traceability gap on test coverage measurement
Impediment Type: non-technical Referring next to FIG. 4, a schematic flow diagram presenting an embodiment of a reinforcement learning process 400 is shown. The reinforcement learning process 400 is performed as part of what will be referred to as a "Stage Two", which can follow Stage One. The reinforcement learning process 400 is configured to automatically detects and identifies the features of the active learning cycle by which the accuracy can be improved by self-learning. In other words, the reinforcement learning process 400 can identify specific features and parameters that should be adjusted, removed, added, or fine-tuned to increase the accuracy of the active learning model.

As ga general matter, reinforcement learning techniques may learn from interacting with the environment, with no need for pairs of input and correct outcome. Feedback data may include a reward signal. Example reinforcement learning algorithms may include R code, PYTHON code, and TENSORFLOW software. In some embodiments, the reward is the objective function to maximize. It may be used by the techniques to quantify the performance of taking one action or another. For example, in an impediment classification, the aim is to maximize the classification accuracy. Therefore, the reward may be defined based on the accuracy obtained with the chosen classification. In cases where reinforcement learning is model-free, no deterministic model of the environment is needed. The environment may be defined using states, and the objective function to optimize (reward) may be determined. Example techniques discussed herein may define a finite number of states depending on the weighted classification accuracy obtained during the last active learning cycles for each impediment and some thresholds. Thus, accuracy may be maximized while the number of revisions may be reduced significantly.

In a first step 410, a reinforcement learning module (RLM) will receive and process the output from the active learning cycle (see Stage One), defining all states and actions in the output. At this time, the RLM defines the states and actions 440 (e.g., State 1, State 2, State 3, etc. and Action 1, Action 2, etc.). In first step 410, features (outputted from Stage 1) which are calculated to have a direct impact on or correspondence with accuracy will be selected as the 'states', while the 'actions' will represent or indicate the percent to improve the accuracy. Some non-limiting examples of possible states can include (a) increase sample size, (b) increase metadata for clustering, (c) increase similarity threshold, (d) update the model and run, (e) further increase sample size and/or metadata and/or similarity threshold, and (f) further increase similarity threshold, etc. Some non-limiting examples of possible actions can include (a) increase the accuracy by 30%, (b) increase the accuracy by 60%, and (c) increase the accuracy by 90%, etc.

In a second step 420, the RLM can define the rewards that will be linked to each state and action, thereby forming or building a network path for optimal solution. A reward is calculated for the actual state and the selected action, and a Q matrix can be updated. For example, the RLM can implement a reward matrix 450 to map each state and action and automatically assign rewards. Thus, if the RLM's decision decreases the accuracy over the next active learning cycle, it will automatically self-assign a negative impact or impose a reduction of reward. The RLM is configured to self-generate a reward matrix for the network that optimizes the active learning cycle's performance accuracy. In other words, the RLM can take the parameters calculated during the active learning cycle, and identifies how the active learning could be fine-tune to increase accuracy (i.e., what are the actions that should be taken to modify the performance of the algorithm). In one example, the RLM identifies the stage that passed through the active learning cycle where a particular error occurs and determines which parameters are causing that error. In a third step 430, the RLM will suggest an optimal network path that results in an optimal solution in order to classify "Technical" and "Non-Technical" impediments. This path can involve multiple and various iterations, as discussed with respect to Stage Three below. At Stage Three, the active learning cycle 300 of FIG. 3 is repeated in a feedback loop stemming from the fifth step 350 (model decision) to the third step 330 (model training) in order to improve accuracy of the initial active learning model. Thus, during Stage Three, the loop is repeated to augment the active learning process with reinforcement learning.

For purposes of illustration, one example of the feedback loop is described below. During a first iteration, for a first defined action in which classification accuracy is to be increased to 50-55%, the RLM can generate or output the following sequence of state definitions for its network path: a first state corresponding to "increase sample size by 20%", followed by a second state corresponding to "increase threshold by 0.2", followed by a third state corresponding to "update the model and run", followed by a fourth state corresponding to "freeze sample size", and then a fifth state causing the model to be updated and run again, based on these updated parameters/feature conditions.

During a subsequent second iteration, for a second defined action in which classification accuracy is to be increased to 61-65%, the RLM can generate or output the following sequence of state definitions for its network path: a sixth state corresponding to "increase threshold by 0.2", followed by a seventh state corresponding to "update the model and run", followed by an eighth state corresponding to "freeze sample size", followed by a ninth state corresponding to "increase threshold by 0.3", and then a tenth state causing the model to be updated and run again, based on these updated parameters/feature conditions.

During a subsequent third iteration, for a third defined action in which classification accuracy is to be increased to 82-85%, the RLM can generate or output the following sequence of state definitions for its network path: an eleventh state corresponding to "freeze sample size", followed by a twelfth state corresponding to "increase threshold by 0.3", followed by a thirteenth state causing the model to be updated and run again, based on these updated parameters/feature conditions.

It should be appreciated that the combination of active learning with a reiterative reinforcement learning process offers significant improvements to the performance of the system. Following an initial active learning cycle and attempt at impediment classification, the reinforcement learning module can analyze its output to see if any parameters need to be changed, and then send its decision back to the active learning for modification and improvement.

For example, the data size that is needed to train and implement the classification model is substantially smaller than what would be required by traditional machine learning or deep learning algorithms while maintaining the same levels of accuracy. In addition, the data in the proposed system is harvested from multiple sources, as described with respect to FIG. 2, which differ in format and structure. The use of an active learning paradigm enables the system to understand the impediment's context from the data even though the sample size may be low, in contrast to other models such as machine learning or deep learning. Furthermore, the RLM is implemented to suggest, identify, or map an optimal network path that leads to an optimal solution with improved accuracy, in order to reliably classify each impediment as either "Technical" or "Non-Technical". Thus, the combination of both active and reinforcement learning techniques together allow the system to operate with optimal accuracy while classifying impediments, despite a limited data set size, that would not otherwise be available. For example, during experimental testing of the proposed system, active learning alone offered an F1 score of 0.24 (with a slight increase to 0.32 when a subsequent iteration of the cycle was performed with a decrease in threshold). However, when active learning and reinforcement learning were used in combination, the results improved sharply, as shown in Table 2 below.

TABLE 2

| Training Experiment | Threshold | Sample Size | F1 Score |
| --- | --- | --- | --- |
| Training-Iteration 1 | 0.2 | 84 | 0.56 |
| Training-Iteration 2 | 0.2 | 100 | 0.68 |
| Training-Iteration 3 | 0.3 | 100 | 0.83 |

Figure 5:
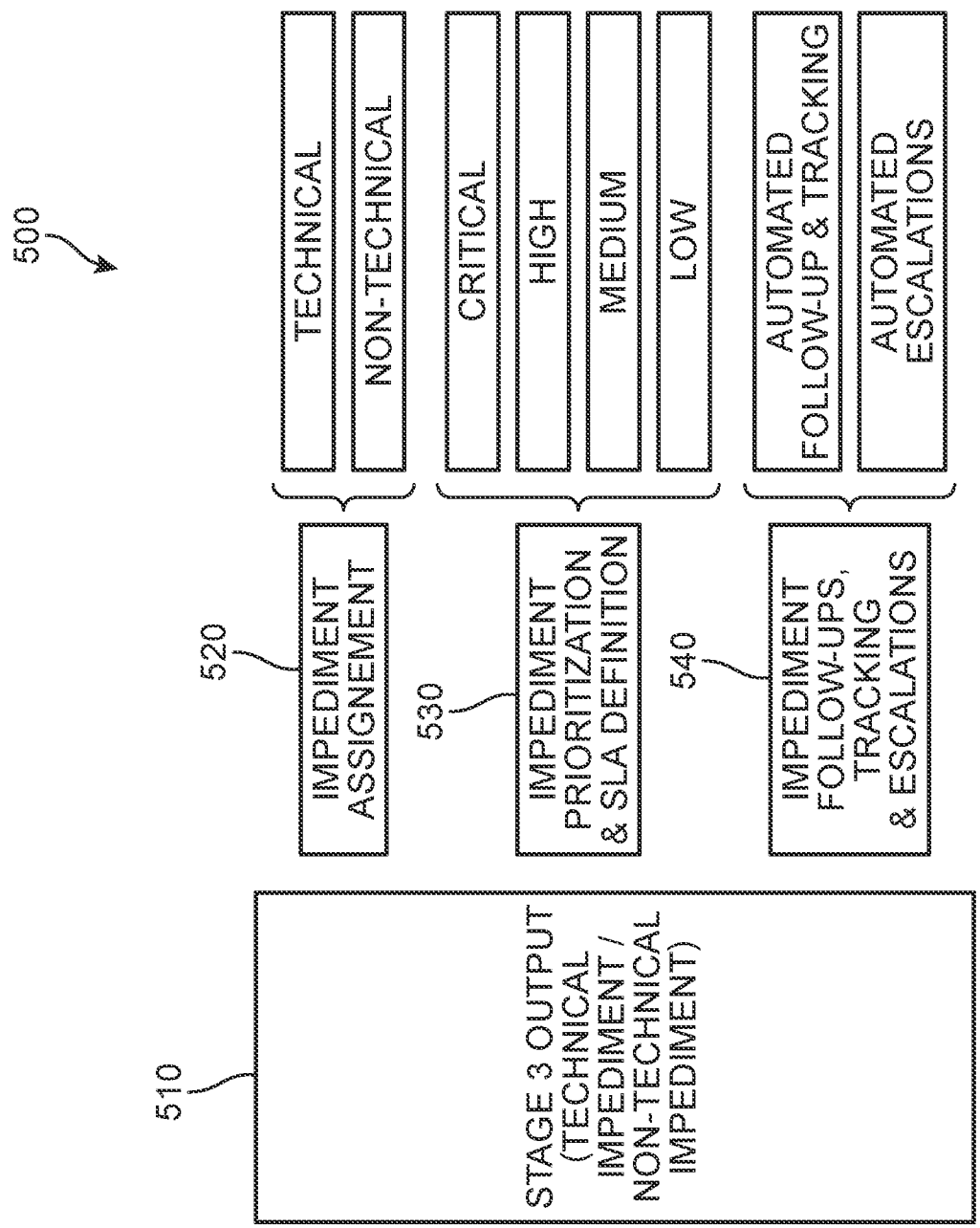
FIG. 5 is a schematic diagram presenting an impediment reporting process, according to an embodiment.

Referring next to FIG. 5, a schematic flow diagram presenting an embodiment of an impediment reporting process 500 is shown. The impediment output reporting process 500 is performed as part of what will be referred to as a "Stage Four", which follows Stage Three. As output 510 from Stage Three (i.e., impediments classified as technical or non-technical) is received, three different sub-processes can be performed, including a first sub-process 520, a second sub-process 530, and a third sub-process 540. During the first sub-process 520, impediment assignment is performed, where the classification of the impediment is used to identify the person, group or other resource(s) that will receive assignments of each of the detected impediments.

In the second sub-process 530, an impediment prioritization is determined, for example by reference to the SLA (service level agreement) definitions. During the second sub-process 530, the system can automatically classify an impediment's priority based on context and keywords associated with the impediment, as well as automatically assign an SLA based on the designated impediment priority. In one example, the priority code or label given to an impediment can be categorized as "which critical", "high", "medium", and "low", can be used to determine how the impediment may then be tracked and managed. For example, the highest priority impediments will be the most urgent in terms of timeframe for response (e.g., 8 hours), while the lower priority impediments will be less urgent (unless later escalated) and additional time allowed for their resolution (e.g., 4 days). Furthermore, the priority can also affect who will be notified or requested to address the impediment. In addition, if the initial point of contact does not respond or fails to resolve the issue, the system can automatically move to the next level of contacts to re-assign responsibility for the impediment, thereby ensuring the impediment is noticed and handled from end-to-end. Impediment priority is also determined based on whether the resolution of the impediment is a necessary condition for the successful completion of some other work item. If other team member's work is dependent on the impediment's resolution, the priority assigned to the impediment can be raised, in recognition of its larger impact on the team's work.

Finally, the third sub-process 540 involves impediment follow-ups, tracking, and escalations. During the third sub-process 540, the system can automatically follow-up on the status of impediments with assigned stakeholders (a party with an interest in a development team's output) in order to track the resolution of the impediment up until closure. In some embodiments, the system can monitor each communication channel to automatically determine whether a given impediment has been resolved or closed. In addition, the third sub-process 540 can be configured to escalate an impediment to a higher priority level (e.g., "critical", "high", "medium") if the SLA or POC (proof of concept) is not being met as closure time approaches. Automated escalations can prevent or reduce the frequency in which project tasks are "blocked", where a work item can no longer be progressed due to an impediment which team members are unable to resolve and block team progress.

Figure 6:
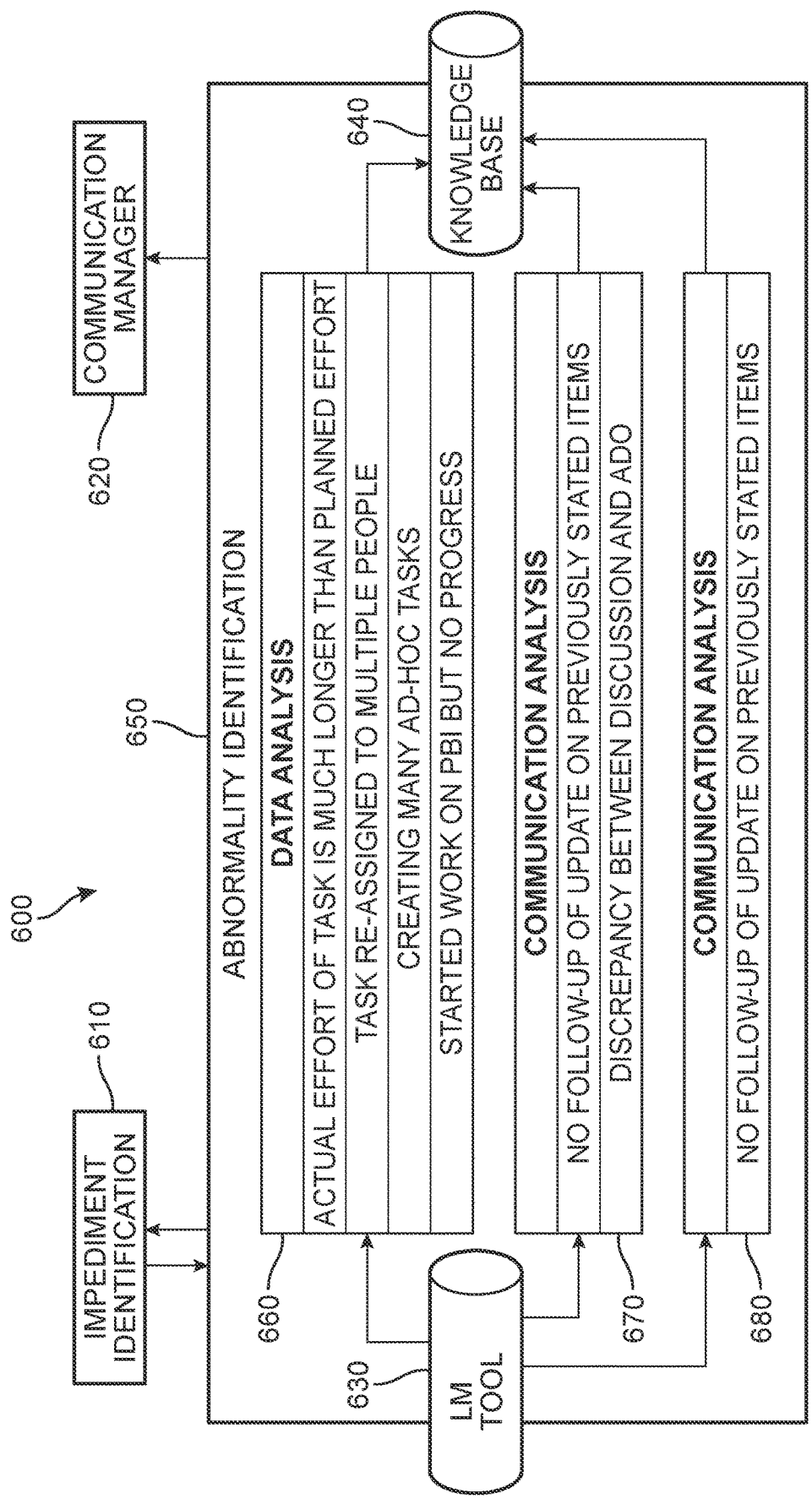
FIG. 6 is a schematic flow diagram presenting an impediment identification process, according to an embodiment.

For purposes of clarity, a flow diagram depicting an embodiment of an impediment identification process 600 is shown in FIG. 6. It can be seen that an initial assessment of the content involves an abnormality identification 650. In this example, the content under review has been collected from an LM tool 630. The data can be evaluated by one or more modules that can identify the potential abnormalities based on a specific context or metric. Each module can make reference to a knowledge base 640 that stores and maintains information about the project as a whole, such as team meeting-related and defined concepts including (for example) acceptance criteria, actionable metrics, the backlog, backlog refinement, batch, burn-down chart, the burn-up chart, DoD, DoR, engineering practices, engineering standards, epic, estimation, forecast, work item latency, metrics, minimum usable subset, minimum viable product, non-functional requirements, operating model, release plan, requirements, scope, station, work unit points, throughput, time-box, velocity, waste, and work in progress.

In this case, three modules (data analysis module 660, communication analysis module 670, and health check module 680) are shown. The data analysis module 660 is configured to identify issues such as but not limited to whether the (a) actual effort of a task is much longer or exceeds the expected or planned effort for this task; (b) task has been re-assigned to multiple people (leading to confusion or overlapping efforts); (c) creation of ad-hoc tasks has exceeded a particular number or frequency; and (d) work has been started on a PBI but no progress has been reported or captured. Similarly, the communication analysis module 670 is configured to identify issues such as but not limited to whether there has been no follow up on previously identified items, or the presence of discrepancies between discussions and the software development. In addition, the health check module 680 is configured to assess the availability of various environments for project-related work to be performed. These abnormalities, when identified, are shared with an impediment identification module 610 for further review, and/or forwarded to selected team personnel via a communication manager 620.

Figure 7:
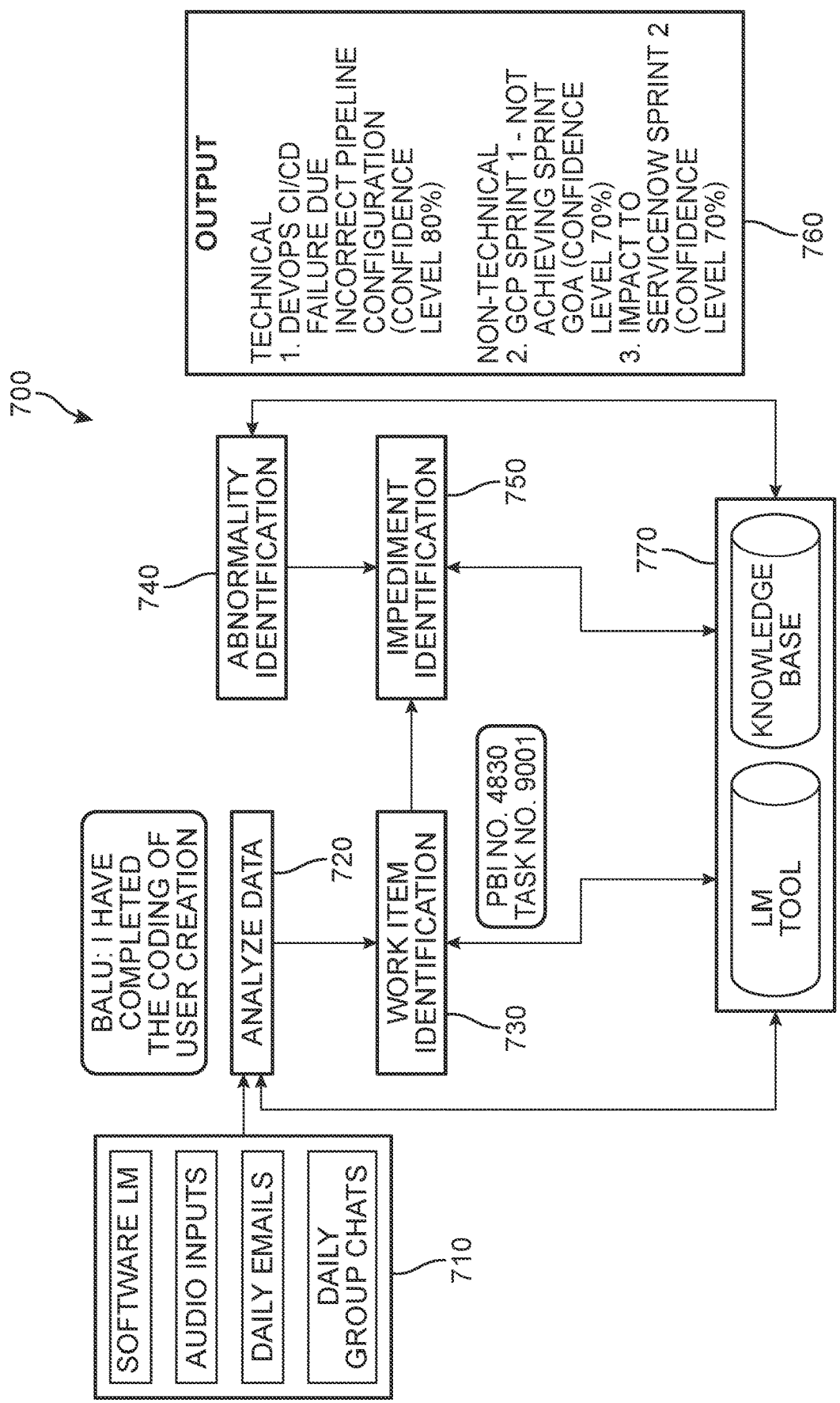
FIG. 7 is an example use-case for the proposed impediment management system, according to an embodiment.

In order to better illustrate the benefits offered by the proposed system, an example use-case 700 is schematically depicted in FIG. 7. In a first stage 720, input data 710 collected from the various channels (e.g., LM data from sources such as Azure DevOps/Jira, audio inputs from the daily team meeting, development planning, etc., daily emails, daily group chats, and other project related communications) are analyzed. Thus, as team members participate in voice-based meetings, the bot can 'listen' and log each statement or question as an input that is transcribed and then evaluated by the abnormality identifier. Similarly, as emails or chat messages are exchanged through the course of a day, the bot will monitor the details being sent to determine whether there are potential abnormalities that could lead to an impediment. In different embodiments, all of this project-related data—sourced from multiple different sources and having various/diverse formats and types—are collected each day and grouped together as a single data set. In a second stage 730, work items are identified in the input data 710 with reference to resources 770 (knowledge base and LM tool). Work items can, for example, be identified by a "FBI" Number and/or task number, by use of a python-based rule. Impediment identification (based on abnormality identification 740) occurs during a third stage 750, which can also make reference to resources 770.

In FIG. 7, an example impediment output report 760 is presented in which the impediments are categorized as either technical or non-technical. For purposes of this example, the technical impediment identified includes "Development and Operations System CI/CD Failure due incorrect pipeline configuration (Confidence Level 80%)", while non-technical impediments identified include "GCP Sprint 1—Not achieving sprint Goal (Confidence Level 70%)" and "Impact to ServiceNow Sprint 2 (Confidence Level 70%)". In other examples, the output can include other details, such as "Industry standard authentication logic is not followed (OAuth2.0)—Assigned to: Developer/SLA: 2.8 Days/Priority: Medium" and "Team member Balu was not able to start work as the code repository was not available—Assigned to: Developer/SLA: 1.2 days/Priority: Critical" as technical impediments, and "Balu and entire team is not aware of required standards—Assigned to: Product Owner/SLA: 2.4 days/Priority: Medium" as a non-technical impediment.

For purposes of reference for the reader, a chart outlining some examples of the proposed processes and systems is given below:

| Steps | Stage | Tasks | Techniques | Input | Output |
|---|---|---|---|---|---|
| 1 | | Daily conversation chats/email/audio Comments in LM Project development tools | N/A | N/A | Dataset of data points harvested from various communication channels |

-continued

| Steps | Stage | Tasks | Techniques | Input | Output |
|---|---|---|---|---|---|
| | | Other communication channels | | | |
| 2 | Zero-Data Preparation and Duplicates Removal | Analyze data | Intelligent Impediment Management Framework | Step 1 | Data Collection from multiple channels, extract the important features, Named Entity Recognition Entities from Daily Email/Chat/Calls. Group the data from multiple channels, remove the duplicates and make it as unified dataset |
| 3 | | Work item identification | Python Rule Based Logic | Steps 1, 2 | Work Items Identifier and Work Item Description |
| 4 | One-Active Learning Two-Reinforcement Learning Reward Matrix Three-Feedback loop of Reinforcement learning + Active Learning Four-Auto Assignment, prioritization. SLA Definitions and intelligent follow-up | Impediment identification | Intelligent Impediment Management Framework | Step 2 | Data Pre-processing and Cleaning of data. Apply Active learning on the subset of the data |
| | | | | Step 3 | Active learner learns from the keywords and the context from the input text and do the active classification as "Technical" or "Non-Technical" impediments |
| | | | | Step 4 | 1. Reinforcement learning (RL) understands the output from the active learning 2. RL auto-detects the parameters of the active learning by which the accuracy can be improved 3. RL defines the rewards to each state and action which forms network path for optimal solution |
| | | | | Step 5 | Retrain the model to have better accuracy |
| | | | Impediment Classification Tool | Step 6 | Classify Technical and Non-Technical Impediment |
| | | | Auto Assignment and SLA evaluation | Step 7 | Based on the technical and non-technical impediments given by the system, it is assigned to corresponding POCs with appropriate SLAs |
| | | | Impediment Assignment | Step 8 | Further bifurcation of the Impediment helps us in identifying the assignments of the impediments. |
| | | | Impediment Prioritization | Step 9 | Auto-classify impediment priority based on context and Keywords associated with the impediment. |
| | | | SLA Definition | Step 10 | Auto assign SLA based on the Impediment priority. |
| | | | Intelligent Impediment Follow-ups | Step 11 | Auto follow-ups of impediments with assigned stakeholders to get regular updates until closure. (If no updates received in the other conversations-Calls, chats, etc.) |
| | | | Auto Escalation | Step 12 | Auto escalate the impediment to the next level of escalation POC if SLA is not met. |
| 5 | | Abnormality identification | Python Rule Based Logic, Anomaly Detection Algorithm | Steps 1, 2 | Potential Abnormalities |

Figure 8:
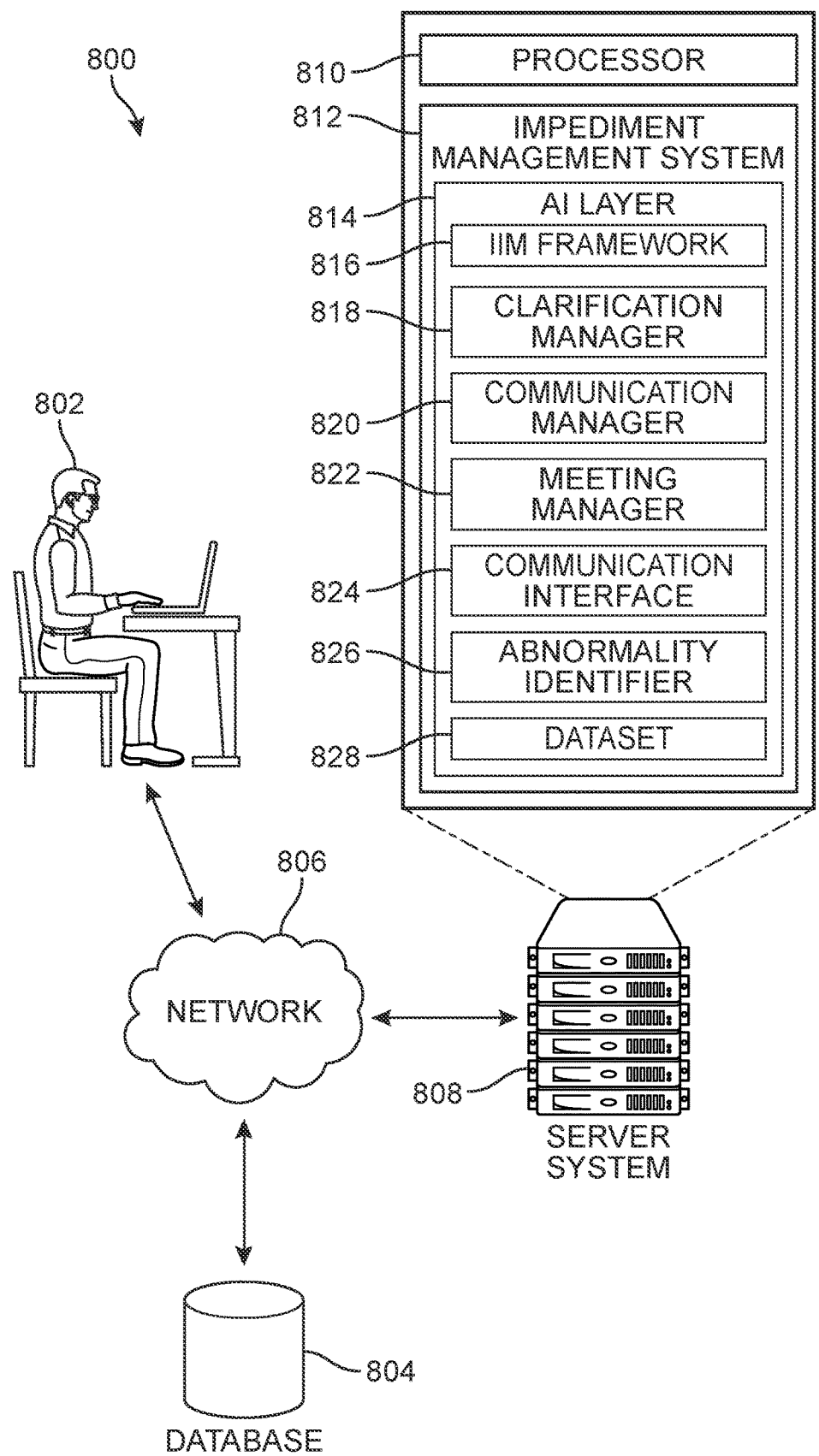
FIG. 8 is a diagram depicting example environments and components by which systems and/or methods, described herein, may be implemented.

FIG. 8 is a schematic diagram of an environment 800 for an impediment management system 814 (or system 814), according to an embodiment. The environment 800 may include a plurality of components capable of performing the disclosed methods. For example, environment 800 includes a user device 802, a computing/server system 808, and a database 804. The components of environment 800 can communicate with each other through a network 806. For example, user device 802 may retrieve information from database 804 via network 806. In some embodiments, network 806 may be a wide area network ("WAN"), e.g., the Internet. In other embodiments, network 806 may be a local area network ("LAN").

As shown in FIG. 8, components of the system 814 may be hosted in computing system 808, which may have a memory 812 and a processor 810. Processor 810 may include a single device processor located on a single device, or it may include multiple device processors located on one or more physical devices. Memory 812 may include any type of storage, which may be physically located on one physical device, or on multiple physical devices. In some cases, computing system 808 may comprise one or more servers that are used to host the system.

While FIG. 8 shows one user device, it is understood that one or more user devices may be used. For example, in some embodiments, the system may include two or three user devices. In some embodiments, the user device may be a computing device used by a user. For example, user device 802 may include a smartphone or a tablet computer. In other examples, user device 802 may include a laptop computer, a desktop computer, and/or another type of computing device. The user devices may be used for inputting, processing, and displaying information. Referring to FIG. 8, environment 800 may further include database 804, which stores test data, training data, and/or other related data the impediment management system 814 as well as other external components. This data may be retrieved by other components for system 814. As discussed above, system 814 may include an intelligent impediment framework 816, a clarification manager 818, a communication manager 820, a meeting manager 822, a communication interface 824, an abnormality identifier 826, and a dataset 828. Each of these components may be used to perform the operations described herein.

Figure 9:
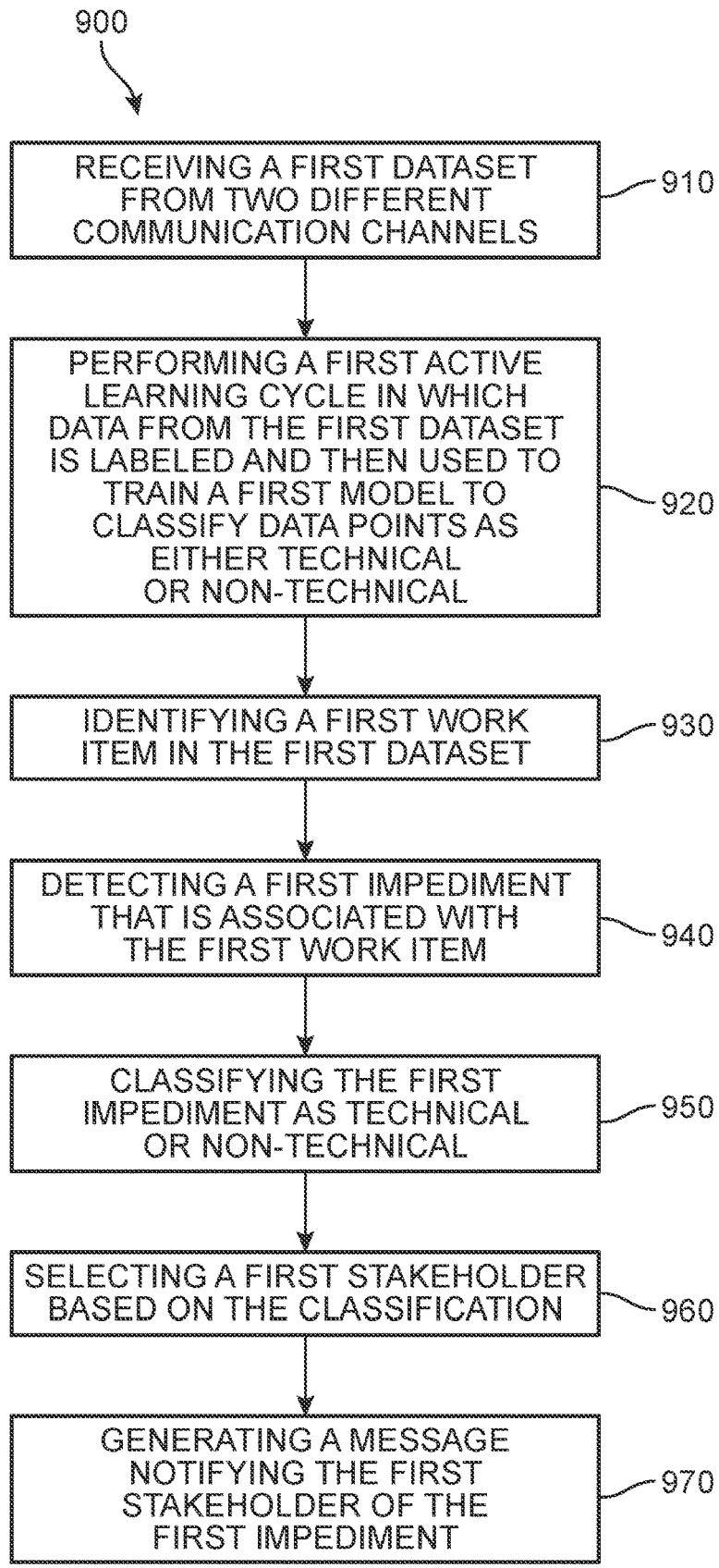
FIG. 9 is a flow chart depicting a method for artificial intelligence (AI)-based impediment management during project development lifecycles, according to an embodiment.

FIG. 9 is a flow chart illustrating an embodiment of a method 900 of artificial intelligence (AD-based impediment management during project development lifecycles. As shown in FIG. 9, a first step 910 of the method 900 includes receiving a first dataset associated with a first project, the first dataset including first content from a first communication channel and second content from a second communication channel, where a first format of the first dataset differs from a second format of the second dataset. In some embodiments, the method also includes selecting a subset of the first dataset to train a classification model. A second step 920 includes performing, by an active learning module, a first active learning cycle in which data from the first dataset is labeled and then used to train a first model to classify data points as either technical or non-technical based on a classification feature set. A third step 930 includes identifying at least a first work item in the first dataset, and a fourth step 940 includes detecting, with respect to a first data point in the first dataset, a first impediment that is associated with the first work item. In addition, the method 900 includes a fifth step 950 of classifying, using the first model, the first impediment as technical or non-technical, a sixth step 960 of selecting a first stakeholder of the first project based on the classification of the first impediment, and a seventh step 970 of generating a message notifying the first stakeholder of the first impediment.

In other embodiments, the method may include additional steps or aspects. In one example, the method 900 further includes steps of producing, via the active learning module, a first output including the classification of the first impediment, receiving, at a reinforcement learning module, the first output, determining, via the reinforcement learning module and based on the first output, modification of a first parameter associated with a first feature of the classification feature set will improve accuracy of the first model, and defining a first state as a modification to the first parameter. In some examples, the method can also include steps of selecting, at the reinforcement learning module and based on the definition of the first state, a first action from a set of actions (pre-defined), calculating a first reward for mapping the first state with the first action, and generating a reward matrix configured to improve an accuracy of the active learning module based on the first reward. Furthermore, in another example, the method can also include a step of performing, by the active learning module, a second active learning cycle in which the first model is refined based on the generated reward matrix, thereby improving the accuracy of the first model.

In another embodiment, the method 900 can include assigning a first priority level to the first impediment based on one or more definitions in a service level agreement for the first project. In some embodiments, the method can then also include automatically escalating a priority of the first impediment from the first priority level to a second priority level in response to the first impediment being unresolved for longer than a first pre-selected duration. In one embodiment, the method can also include steps of selecting a second stakeholder (different from the first stakeholder) of the first project in response to the escalation of the first impediment, and generating a message notifying the second stakeholder of the first impediment.

In different embodiments, the classification feature set includes one or more of sample size, metadata for clustering, similarity thresholds, model updates, etc. In some embodiments, the first communication channel is one of a daily meeting recording or transcript, emails, chats, voicemails, meeting notes, recording of meetings, phone calls, text messages, etc.

As described herein, during software deployment framework-based development, impediments during project execution are common. Project team members and stakeholders often spend a considerable amount of time and effort manually tracking and updating impediments, or recording them for current and future opportunities. Team Master/Project Managers must then manually follow-up with respective stakeholders to resolve impediments. In addition, a lack of identification of early warning signals during a project lifecycle can lead to unforeseen bottlenecks, whereas a lack of a data-driven knowledge repository for storing impediment-related expertise leads to redundancy and time waste. The proposed impediment management assistant may provide key guidance for a development team to discover impediments that may cause delays, for example, in producing working software early in an iteration. Impediments may be escalated automatically in order to be addressed by appropriate personnel in a timely manner.

The impediment management assistant may thus ensure the required intelligence needed for sending customized context specific alerts, emails, and messages based on criticality and impact of an impediment. Furthermore, the proposed systems may facilitate the understanding of impediments based on the utilization of descriptive analytics (e.g., what is happening) through software lifecycle management (LM) tools, diagnostic analytics (e.g., why is it happening) through data patterns of past projects, and help teams in predictive analytics (e.g., what will happen) to identify the impact of an impediment on a specified outcome. Impediments may also be logged and maintained the LM tool (or other software development tool) with ownership, timelines, and dependency. An impediment may be escalated to appropriate personnel through a chatbot/email/SMS trigger after a defined threshold of time. The impediment management assistant may provide an alert system to context level (e.g., individual or team accountability) for follow-ups, resolving impediments and tracking the impediments for closure. The impediment management assistant thereby improves visibility of impediments, and helps bring attention to the impediment before it can negatively impact future work items. The proposed systems and methods enable the capture and tracking of impediments automatically, serving as a significant mitigation of risk. A self-learning capability allows the disclosed tool to generate intelligent suggestions and insights about possible solutions and resources that may be used in handling the impediment. Automated and personalized follow-ups reduce team complacency in responding to the problem, as well as the risk of an impediment falling off the radar during manual oversight.

To provide further context, in some embodiments, some of the processes described herein can be understood to operate in a system architecture that can include a plurality of virtual local area network (VLAN) workstations at different locations that communicate with a main data center with dedicated virtual servers such as a web server for user interfaces, an app server for OCR and data processing, a database for data storage, etc. As a general matter, a virtual server is a type of virtual machine (VM) that is executed on a hardware component (e.g., server). In some examples, multiple VMs can be deployed on one or more servers.

In different embodiments, the system may be hosted at least in part in a cloud computing environment offering ready scalability and security. The cloud computing environment can include, for example, an environment that hosts the document processing management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource"). It is contemplated that implementations of the present disclosure can be realized with appropriate cloud providers (e.g., AWS provided by Amazon™, GCP provided by Google™, Azure provided by Microsoft™, etc.).

In different embodiments, applications of the system are built and deployed by a software framework. A software framework is a universal, reusable software environment that provides particular functionality as part of a larger software platform to facilitate development of software applications. Software frameworks may include support programs, compilers, code libraries, tool sets, and application programming interfaces (APIs) that enable development of a software application. Some implementations can provide a user device and/or component management platform that is capable of facilitating the development of software applications through the use of a user interface designed to be simple to use, and re-usable software components (e.g., buttons, links, fields, graphics, and/or the like) that can be displayed in the user interface and generated in multiple different software frameworks and/or programming languages for a variety of platforms. For example, the component management platform may provide a first software application that includes a user interface through which a user can develop a second software application. The user may use features of the user interface to create software components that are displayed in the first software application (e.g., the UI) using a first programming language (e.g., hypertext markup language (HTML) or another programming language associated with the first software application) and generated in a first software framework (e.g., a software framework associated with the software application being developed). The user interface may include features, such as drag and drop operations for the creation of software components and selectable software component characteristics, to facilitate creation and customization of software components. In some implementations, the component management platform may store components that were previously generated by users, generate copies of software components in multiple software frameworks and/or for different platforms, and make software components available for users to include in software applications that are under development.

In this way, a user device and/or cloud server may facilitate the development of software applications in multiple software frameworks and for multiple platforms, without requiring special knowledge or repeated component development on the part of a user, and in a manner designed to be relatively quick and efficient. Special software framework knowledge and/or familiarity may not be required, for example, by using a user interface to enable the generation of software components in multiple software frameworks in a single integrated development environment, such as a web-based integrated development environment that is accessible from any device with a web browsing application browser. Some non-limiting examples of such frameworks include Microsoft. NET™, the EMC™ integrated development environment, the Microsoft™ Visual Studios integrated development environment for writing and debugging code, and the Eclipse™ integrated development environment for incorporation of open source code. Reusable software components may significantly increase the speed and efficiency of software development, including facilitating more efficient use of software developer time and computing resources (e.g., processor resources, memory resources, and/or the like). Some implementations may reduce network communications relative to a purely cloud-based application development solution, e.g., by enabling the user device to perform much of the functionality for component and software application development without the need to interact with a server computer over a network, which would introduce latency into the development process. Furthermore, some implementations described herein use a rigorous, computerized process to perform tasks or roles that were not previously performed. Also, automating the process for generating software components conserves computing resources (e.g., processor resources, memory resources, and/or the like) and time that would otherwise be wasted by using manual development processes for attempting to create multiple software components in multiple software frameworks.

In some embodiments, the software development application may be an application installed on and executed by the user device. In some implementations, the software development application may be a web-based application designed to execute a web application (e.g., an application operating on a server computer or the component management platform, and implemented in HTML, JavaScript, and/or the like). The software development application may be written in a variety of programming languages and provide a variety of different types of user interface elements, which may be used in the development of a new software component and/or another software application. In some embodiments, the software development application includes a component toolbox. The component toolbox may be presented via a user interface offering one or more interactable user interface elements, such as buttons, which are associated with software components. For example, the component toolbox may include one or more buttons for the generation of software components, such as input components (e.g., buttons, checkboxes, dropdown lists, toggle buttons, text fields, and/or the like), navigational components (e.g., search fields, sliders, pagination indicators, links, icons, and/or the like), informational components (e.g., tooltips, progress bars, message boxes, images, and/or the like), and/or the like. In some implementations, the component toolbox may include user interface elements that generate a software component based on a pre-existing software component (e.g., a previously created software component). In some implementations, the component toolbox may include a user interface element designed to enable the creation of a new software component, which may enable a user of the user device to define a new type of software component.

For purposes of this disclosure, the Application Programming Interfaces (APIs) may refer to computer code that supports application access to operating system functionality. A platform dependent API may be understood to rely on the functionality of a particular software platform. The platform dependent API may use device specific libraries or native code allowing access to the mobile device at a low level. The API can be configured to provide a wide range of visualization dashboards for document processing management, as will be discussed below.

Furthermore, as noted earlier, the system can incorporate a specialized optical character recognition (OCR) engine to aid in data extraction. In some implementations, the OCR engine may include an OmniPage® OCR engine, a Google® Cloud Vision API OCR engine, Microsoft® Azure Computer Vision API OCR engine, an IBM® Bluemix OCR engine, and/or the like. In some implementations, the OCR engine may convert the documents into an electronic format (e.g., the digitized documents). Optical character recognition involves a conversion of images of typed, handwritten, or printed text into machine-encoded text. For example, OCR may be applied to a scanned document, a photo of a document, a photo of a scene that includes text, and/or the like, to produce electronic data (e.g., text data). OCR can be used as a form of information entry from printed paper data records (e.g., printed forms, printed tables, printed reports, identification documents, invoices, bank statements, and/or the like). Converting printed text to electronic data allows the information represented by the printed text to be electronically edited, searched, stored more compactly, displayed online, and/or used in machine processes such as cognitive computing, machine translation, (extracted) text-to-speech, key data and text mining, and/or the like. Implementations of OCR may employ pattern recognition, artificial intelligence, computer vision, and/or the like. Content clustering, whereby content of OCR-ed source documents is parsed and chunks are identified, can be performed next. Each chunk will contain text and location. In addition, an Inter Chunk Distance (ICD) is calculated using a custom distance function for all chunks to form an ICD Matrix. An Epsilon value, required for DBSCAN (Density-Based Spatial Clustering of Applications with Noise) is calculated based on the distance matrix, and the chunks are then clustered with the modified DBSCAN-based clustering algorithm to find text groups/phrases and paragraphs.

The generated map and values of common and/or related fields can be used to train a neural network model for identifying the map best suited for a document field. The trained model can then be used to identify the best map for fields and perform the data extraction. Thus, during extraction, the values of related fields can be used along with the trained model to identify the map. The identified map can then be used to extract the field. The extractor can use Levenshtein Distance for locating text without an exact match in the document. In some embodiments, a machine learning model is used to detect data included in the digitized documents, including but not limited to a Google™ API machine learning model, a Microsoft™ Azure API machine learning model, an IBM™ Bluemix API machine learning model, a classifier machine learning model, etc. In some embodiments, the system may perform a training operation on the machine learning model with the digitized documents or with information that includes different inputs. For example, the system may separate the digitized documents into a training set, a validation set, a test set, and so forth. In some implementations, the system may train the machine learning model using, for example, an unsupervised training procedure and based on the training set of the digitized documents. For example, the system may perform dimensionality reduction to reduce the digitized documents to a minimum feature set, thereby reducing resources (e.g., processing resources, memory resources, and/or the like) to train the machine learning model, and may apply a classification technique to the minimum feature set. Additionally, or alternatively, the system may use a support vector machine (SVM) classifier technique to generate a non-linear boundary between data points in the training set. In this case, the non-linear boundary is used to classify test data into a particular class.

Additionally, or alternatively, the system may train the machine learning model using a supervised training procedure that includes receiving input to the machine learning model from a subject matter expert or other operator, which may reduce an amount of time, an amount of processing resources, and/or the like to train the machine learning model of activity automatability relative to an unsupervised training procedure. In some embodiments, the system may use one or more other model training techniques, such as a neural network technique, a latent semantic indexing technique, and/or the like. For example, the system may perform an artificial neural network processing technique (e.g., using a two-layer feedforward neural network architecture, a three-layer feedforward neural network architecture, and/or the like) to perform pattern recognition with regard to patterns of whether a document includes a particular response type or input value. In this case, using the artificial neural network processing technique may improve an accuracy of the trained machine learning model generated by the system by being more robust to noisy, imprecise, or incomplete data, and by enabling the electronic document platform to detect patterns and/or trends undetectable to human analysts or systems using less complex techniques. In some embodiments, the machine learning model may include a support vector machine model, a linear regression model, a logistic regression model, a naive Bayes model, a linear discriminant analysis model, a decision tree model, a k-nearest neighbor model, a neural network model, and/or the like.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment 222, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

An "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In addition to the algorithms and techniques described above, one or more of the following techniques may be utilized by one or more of the disclosed embodiments: RPA, Mongo DB, Artificial Intelligence (AI) Modules such as Python, Image to Text, OCR, Computer Vision, Image comparison (phase comparison), Image Validation (image to text, then text to text comparison), Learning Algorithms, Similarity Analytics, Sequencing algorithms, Random Forest, graph Convolutional Neural Networks (gCNN), Data Clustering with weighted data, Data Visualization, Rocket Chat, and D3JS.

For purposes of the current description, the terms "organization," "client," "organization resources," or "client resources" refer to database resources (i.e., data, metadata, programs, and other resources) that are maintained in a central multi-tenant database for access by users who have appropriate access privileges. Such resources will generally be managed by a server and data storage system maintained by a platform provider, as opposed to computers within the actual client (tenant) businesses themselves. In addition, a Cloud Service Provider (CSP) may include an organization that provides a cloud computing resource to a client device and/or a user of a client device. Furthermore, the term "component" refers to software applications and other system modules and features comprising or supporting the multi-tenant architecture.

In one implementation, the systems described herein include hardware data storage. Among other operational data, the hardware data storage may store instantiation rules and instantiation metadata. Instantiation circuitry interprets the requirement syntax and executes the instantiation rules with input from the instantiation metadata to issue infrastructure instantiation requests to cause instantiation of the resources requested by the developers. Further, state file unification circuitry facilitates developer collaboration by receiving and managing state files for the individual developer projects. In addition, in some embodiments, the systems described herein includes a validation circuitry. The validation circuitry helps to ensure that the instantiation requests that the systems described herein makes to the infrastructure providers are completed correctly, cause the expected infrastructure results, and that the infrastructure remains correct over time. To that end, the validation circuitry issues validation requests to the infrastructure providers. The infrastructure providers return ICV messages to the systems described herein. Examples of ICV messages include responses to validation requests, responses to instantiation requests, and infrastructure status messages.

The instantiation circuitry, state file unification circuitry, validation circuitry, requests, and other features of the systems described herein improve the operation and function of the underlying computer hardware itself. That is, these features (among others described) are specific improvements in way that the underlying computer system operates and solve technical challenges with infrastructure instantiation and validation, as well as developer collaborating in serverless execution environments. The improvements facilitate more efficient, accurate, consistent, and precise building of resources that will operate properly in serverless function environments. The improved functioning of the underlying computer hardware itself achieves further technical benefits. In addition, the systems described herein provides additional abstraction, so that developers need not be complete experts in complex IaC syntaxes. The developers may instead concentrate on the particular goals of their projects with less time and energy spent on mastering intricate IaC coding.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways.

Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method performed by one or more processors for artificial intelligence based detection and classification of impediments in a network, the method comprising:
   by the one or more processors, receiving from a first communication channel and a second communication channel via the network a first dataset associated with a first project, the first dataset including first content received from the first communication channel and second content received from the second communication channel;
   by the one or more processors, performing, by an active learning module, a first active learning cycle in which data from the first dataset is labeled and then used to train a first model to classify data points as either technical or non-technical based on a classification feature set;
   by the one or more processors, performing, by the active learning module, after the first active learning cycle, a second active learning cycle in which the first model is refined to improve an accuracy of the first model in classifying the data points as either technical or non-technical based on the classification feature set;
   by the one or more processors, identifying at least a first work item in the first dataset;
   by the one or more processors, detecting, with respect to a first data point in the first dataset, a first impediment that is associated with the first work item;
   by the one or more processors, classifying, using the first model as refined in the second active learning cycle, the first impediment as technical or non-technical;
   by the one or more processors, selecting a first stakeholder of the first project based on the classification of the first impediment;
   by the one or more processors, generating a message of the first impediment based on the selection of the first stakeholder; and
   by the one or more processors, transmitting the message of the first impediment to a user device associated with the first stakeholder.

2. The method of claim 1, further comprising:
   by the one or more processors, producing, via the active learning module, a first output including the classification of the first impediment;
   by the one or more processors, receiving, at a reinforcement learning module, the first output;
   by the one or more processors, determining, via the reinforcement learning module and based on the first output, modification of a first parameter associated with a first feature of the classification feature set will improve the accuracy of the first model; and
   by the one or more processors, defining a first state as the modification to the first parameter.

3. The method of claim 2, further comprising:
   by the one or more processors, selecting, at the reinforcement learning module and based on the definition of the first state, a first action;
   by the one or more processors, calculating a first reward for mapping the first state with the first action; and
   by the one or more processors, generating a reward matrix configured to improve an accuracy of the active learning module based on the first reward.

4. The method of claim 3, a wherein the second active learning cycle is performed based on the generated reward matrix.

5. The method of claim 1, further comprising, by the one or more processors, assigning a first priority level to the first impediment based on one or more definitions in a service level agreement for the first project.

6. The method of claim 5, further comprising, by the one or more processors, escalating a priority of the first impediment from the first priority level to a second priority level in response to the first impediment being unresolved for longer than a first pre-selected duration.

7. The method of claim 6, further comprising:
   by the one or more processors, selecting a second stakeholder of the first project in response to the escalation of the first impediment; and
   by the one or more processors, generating a message notifying the second stakeholder of the first impediment.

8. A non-transitory computer-readable medium storing software, for artificial intelligence (AH-based detection and classification of impediments in a network, the software comprising instructions executable by one or more computers which, upon such execution, cause the one or more computers to:
  receive from a first communication channel and a second communication channel via the network, a first dataset associated with a first project, the first dataset including first content received from the first communication channel and second content received from the second communication channel;
  perform, by an active learning module, a first active learning cycle in which data from the first dataset is labeled and then used to train a first model to classify data points as either technical or non-technical based on a classification feature set;
  perform, by the active learning module, after the first active learning cycle, a second active learning cycle in which the first model is refined to improve an accuracy of the first model in classifying the data points as either technical or non-technical based on the classification feature set;
  identify at least a first work item in the first dataset;
  detect, with respect to a first data point in the first dataset, a first impediment that is associated with the first work item;
  classify, using the first model as refined in the second active learning cycle, the first impediment as technical or non-technical;
  select a first stakeholder of the first project based on the classification of the first impediment;
  generate a message of the first impediment based on the selection of the first stakeholder; and
  transmit the message of the first impediment to a user device associated with the first stakeholder.

9. The non-transitory computer-readable medium storing software of claim 8, wherein the instructions further cause the one or more computers to:
  produce, via the active learning module, a first output including the classification of the first impediment;
  receive, at a reinforcement learning module, the first output;
  determine, via the reinforcement learning module and based on the first output, modification of a first parameter associated with a first feature of the classification feature set will improve the accuracy of the first model; and
  define a first state as the modification to the first parameter cause, in response to the detected discrepancy, a negative reward to be provided to the goal manager model, thereby penalizing the virtual agent.

10. The non-transitory computer-readable medium storing software of claim 9, wherein the instructions further cause the one or more computers to:
  select, at the reinforcement learning module and based on the definition of the first state, a first action;
  calculate a first reward for mapping the first state with the first action; and
  generate a reward matrix configured to improve an accuracy of the active learning module based on the first reward.

11. The non-transitory computer-readable medium storing software of claim 10, wherein the a second active learning cycle is performed based on the generated reward matrix.

12. The non-transitory computer-readable medium storing software of claim 8, wherein the instructions further cause the one or more computers to assign a first priority level to the first impediment based on one or more definitions in a service level agreement for the first project.

13. The non-transitory computer-readable medium storing software of claim 12, wherein the instructions further cause the one or more computers to escalate a priority of the first impediment from the first priority level to a second priority level in response to the first impediment being unresolved for longer than a first pre-selected duration.

14. The non-transitory computer-readable medium storing software of claim 13, wherein the instructions further cause the one or more computers to:
  select a second stakeholder of the first project in response to the escalation of the first impediment; and
  generate a message notifying the second stakeholder of the first impediment.

15. A system for artificial intelligence (A-H-based detection and classification of impediments in a network, the system comprising one or more computers and one or more storage devices storing instructions that are operable, when executed by the one or more computers, to cause the one or more computers to:
  receive from a first communication channel and a second communication channel via the network, a first dataset associated with a first project, the first dataset including first content received from the first communication channel and second content received from the second communication channel;
  perform, by an active learning module, a first active learning cycle in which data from the first dataset is labeled and then used to train a first model to classify data points as either technical or non-technical based on a classification feature set;
  perform, by the active learning module, after the first active learning cycle, a second active learning cycle in which the first model is refined to improve an accuracy of the first model in classifying the data points as either technical or non-technical based on the classification feature set;
  identify at least a first work item in the first dataset;
  detect, with respect to a first data point in the first dataset, a first impediment that is associated with the first work item;
  classify, using the first model as refined in the second active learning cycle, the first impediment as technical or non-technical;
  select a first stakeholder of the first project based on the classification of the first impediment;
  generate a message notifying the first stakeholder of the first impediment; and
  transmit the message of the first impediment to a user device associated with the first stakeholder.

16. The system of claim 15, wherein the instructions further cause the one or more computers to:
  produce, via the active learning module, a first output including the classification of the first impediment;
  receive, at a reinforcement learning module, the first output;
  determine, via the reinforcement learning module and based on the first output, modification of a first parameter associated with a first feature of the classification feature set will improve the accuracy of the first model; and
  define a first state as the modification to the first parameter.

17. The system of claim 16, wherein the instructions further cause the one or more computers to:
  select, at the reinforcement learning module and based on the definition of the first state, a first action;

calculate a first reward for mapping the first state with the first action; and generate a reward matrix configured to improve an accuracy of the active learning module based on the first reward.

18. The system of claim 17, wherein the second active learning cycle is performed refined based on the generated reward matrix.

19. The system of claim 15, wherein the instructions further cause the one or more computers to assign a first priority level to the first impediment based on one or more definitions in a service level agreement for the first project.

20. The system of claim 19, wherein the instructions further cause the one or more computers to escalate a priority of the first impediment from the first priority level to a second priority level in response to the first impediment being unresolved for longer than a first pre-selected duration.

* * * * *